United States Patent
Unnebäck et al.

(10) Patent No.: US 11,318,861 B2
(45) Date of Patent: May 3, 2022

(54) COOLANT SYSTEM FOR A VEHICLE

(71) Applicant: Volvo Construction Equipment AB, Eskilstuna (SE)

(72) Inventors: Joakim Unnebäck, Eskilstuna (SE); Erik Carldén, Kvicksund (SE)

(73) Assignee: Volvo Construction Equipment AB, Eskilstuna (SE)

( * ) Notice: Subject to any disclaimer, the term of this patent is extended or adjusted under 35 U.S.C. 154(b) by 193 days.

(21) Appl. No.: 16/769,259

(22) PCT Filed: Dec. 6, 2017

(86) PCT No.: PCT/EP2017/081656
§ 371 (c)(1),
(2) Date: Jun. 3, 2020

(87) PCT Pub. No.: WO2019/110093
PCT Pub. Date: Jun. 13, 2019

(65) Prior Publication Data
US 2021/0188126 A1 Jun. 24, 2021

(51) Int. Cl.
*H01M 10/613* (2014.01)
*H01M 10/625* (2014.01)
(Continued)

(52) U.S. Cl.
CPC ........... *B60L 58/26* (2019.02); *H01M 10/613* (2015.04); *H01M 10/625* (2015.04); *H01M 10/6556* (2015.04); *H01M 2220/20* (2013.01)

(58) Field of Classification Search
CPC ...... B60L 58/26; B60L 58/27; B60L 2200/40; B60L 2240/36; B60L 2240/545;
(Continued)

(56) References Cited

U.S. PATENT DOCUMENTS

| 8,215,432 | B2 | 7/2012 | Nemesh et al. |
| 10,573,940 | B2 * | 2/2020 | Dunham ........... H01M 10/6567 |

(Continued)

FOREIGN PATENT DOCUMENTS

| DE | 10213209045 A1 | 11/2014 |
| GB | 2055963 A | 3/1981 |

(Continued)

OTHER PUBLICATIONS

International Search Report and Written Opinion of the International Searching Authority, PCT/EP2017/081656, dated Sep. 19, 2018, 10 pages.

*Primary Examiner* — Muhammad S Siddiquee
(74) *Attorney, Agent, or Firm* — Sage Patent Group

(57) ABSTRACT

A coolant system for an electric vehicle having first and second heat generating components includes a fluid circuit that circulates a coolant therethrough and a coolant assembly. The coolant assembly decreases the temperature of a portion of the coolant to a first temperature and supplies the portion of coolant to the first heat generating component via a first supply branch of the fluid circuit, and decreases the temperature of a remaining portion of the coolant to a second temperature and supplies the remaining portion of coolant to the second heat generating component via a second supply branch of the fluid circuit. The system includes a first pump unit, arranged downstream of the coolant assembly in the first supply branch, that directs the portion of coolant to the first heat generating component, and a second pump unit that directs the remaining portion of coolant to the second heat generating component.

11 Claims, 2 Drawing Sheets

(51) Int. Cl.
*H01M 10/6556* (2014.01)
*B60L 58/26* (2019.01)

(58) Field of Classification Search
CPC ..... B60L 1/02; H01M 10/613; H01M 10/625; H01M 10/6556; H01M 2220/20; B60K 2001/003; B60K 2001/005; B60K 2001/008; B60K 1/00; Y02E 60/10; Y02T 10/70; Y02T 90/16
See application file for complete search history.

(56) References Cited

U.S. PATENT DOCUMENTS

| | | | |
|---|---|---|---|
| 2002/0053216 | A1 | 5/2002 | Ap et al. |
| 2009/0280395 | A1* | 11/2009 | Nemesh .............. H01M 10/615 |
| | | | 429/62 |
| 2014/0216689 | A1* | 8/2014 | Lombardo ............. B60H 1/143 |
| | | | 165/104.14 |
| 2015/0298538 | A1 | 10/2015 | Janarthanam et al. |
| 2020/0276879 | A1* | 9/2020 | Kim ........................ B60L 58/26 |

FOREIGN PATENT DOCUMENTS

| | | | |
|---|---|---|---|
| WO | 02079621 | A1 | 10/2002 |
| WO | 2014044481 | A1 | 3/2017 |

* cited by examiner

COOLANT SYSTEM FOR A VEHICLE

CROSS REFERENCE TO RELATED APPLICATIONS

This application is a 35 U.S.C. § 371 national stage application of PCT International Application No. PCT/EP2017/081656 filed on Dec. 6, 2017, the disclosure and content of which is incorporated by reference herein in its entirety.

TECHNICAL FIELD

The invention relates to a coolant system for a vehicle, in particular an electric vehicle, e.g. an electric working machine. The invention also relates to a vehicle comprising such a coolant system, e.g. an electric working machine comprising such a coolant system. The invention is applicable on working machines within the fields of industrial construction machines or construction equipment, in particular electric-powered working machines. Although the invention will be described with respect to an autonomous electric working machine, the invention is not restricted to this particular machine, but may also be used in other working machines such as electric wheel loaders, electric articulated haulers, electric excavators, electric backhoe loaders, and also in other types of electric vehicles such as electric busses, electric trucks, electric cars etc. Additionally, the invention may be used in other vehicles such as hybrid vehicles and vehicles having an internal combustion engine etc.

BACKGROUND

In the field of electric vehicles, e.g. electric-powered working machines, there is an increasing demand on providing sufficiently powerful electric motors to ensure reliable operations at e.g. a work site. In addition, in the field of working machines having autonomous capabilities, it has been observed that there is a challenge in providing enough electric power to operate large and heavy loads, which not only sets high requirements on the electrical motor, but also on the battery capacity.

In connections with theses types of vehicles, efficient temperature control of heat generating components such as the battery pack is central to ensure a reliable operation in an ordinary use of the vehicle. In addition, many types of heat generating components in vehicles require to be operated within their specified operating range. In other words, thermal management for electric vehicle battery systems are central to the performance and longevity of the battery, partly as an efficient thermal management system will enable electric vehicles to drive greater distances.

However, the energy flowing into the battery pack as it is charged or discharged to power the vehicle and its accessories causes heating in the battery cells and their interconnection systems, i.e. other heat generating components in the vehicle. In this context, it should be noted that a too high temperature of the battery pack may lower its performance and shorten its lifetime.

In view of the above, it is desired to control the temperature of the battery in an electric vehicle, such as an autonomous working machine, in order to extend the lifetime of the battery.

Further, it may be a desire to manage cooling of other vehicle heat generating components in order to e.g. provide an efficient traction using an electric system While coolant systems are known which are designed to manage various types of cooling desired for a vehicle, as for example in U.S. Pat. No. 8,215,432, there is still a demand to develop a coolant system based on fluid, which is designed for the cooling of various types of heat generating components in an electric vehicle, such as an electric working machine, in order to optimize the cooling and at least maintain the operational performance of the vehicle.

SUMMARY

An object of the invention is to provide a coolant system for a vehicle, such as an electric vehicle, e.g. an electric working machine, which system aims at increasing the performance of the system, in particular in terms of improved control of providing efficient cooling of various types of vehicle heat generating components. The object is at least partly achieved by a coolant system according to claim 1. According to a first aspect of the present invention, there is provided a coolant system for an electric vehicle, the vehicle comprises at least a first vehicle heat generating component and a second vehicle heat generating component. The coolant system comprises a fluid circuit configured to define a fluid passageway for circulating a coolant there through and a coolant assembly arranged in the fluid circuit.

Moreover, the coolant assembly is configured to decrease the temperature of a portion of the coolant to a first temperature and to supply the portion of coolant to the first vehicle heat generating component via a first supply branch of the fluid circuit. Further, the coolant assembly is configured to decrease the temperature of a remaining portion of the coolant to a second temperature and to supply the remaining portion of coolant to the second heat generating component via a second supply branch of the fluid circuit.

The system further comprises a first pump unit arranged downstream of the coolant assembly in the first supply branch and in fluid communication with the coolant assembly and the first vehicle heat generating component. The first pump unit is configured to direct the portion of coolant to the first vehicle heat generating component.

In addition, the system comprises a second pump. The second pump unit is arranged downstream of the coolant assembly in the second supply branch and in fluid communication with the coolant assembly and the second vehicle heat generating component. The second pump unit is configured to direct the remaining portion of coolant to the second vehicle heat generating component.

In this manner, there is provided a system which provides improved cooling control of the vehicle heat generating components, while permitting different types of vehicle heat generating component to be cooled with different temperatures. Accordingly, the example embodiments of the coolant system are intended for cooling various types of power electronics. The system as mentioned above is particularly useful when the second vehicle heat generating component is a battery pack. As such, the example embodiments provide an improved coolant system for vehicle heat generating components requiring different cooling temperatures, e.g. batteries typically require lower temperatures than other heat generating components.

Thus, the coolant assembly, which is in fluid communication with the first supply branch and the second supply branch, is configured to provide a first portion of coolant and a second portion of coolant having different temperatures. The arrangement according to the example embodiments allows the coolant to be used in the first and second supply branches to have different temperatures since there is an additional cooling of the coolant used in the second supply branch by the coolant assembly before the coolant enters the second pump unit.

In particular, there is a desire to have a lower temperature in the coolant used for the battery pack than what is needed for other vehicle heat generating components.

By arranging a separate pump unit in each one of the first supply branch and the second supply branch in the same coolant system, it becomes possible to control the coolant flow in each circuit in an independent manner for the two circuits. In this manner, there is provided a coolant system having reduced losses compared to e.g. a coolant system utilizing a resistive control of the flow by a variable pilot valve.

The example embodiments are particularly useful for an electric-powered automated hauler, which is a full electric machine. In this type of machine or vehicle, all high voltage components require cooling, e.g. inverters, electric motors and battery packs. In addition, the battery pack is particular sensitive and requires a lower temperature than other components. As such, the second temperature is typically a lower temperature than the first temperature.

By way of example, the second vehicle heat generating component is thus a battery pack. In addition, or alternatively, the first vehicle heat generating component may be any one of an inverter, an electric motor, DC/DC converter, on-board charger or any other electric component. In addition, or alternatively, the first vehicle heat generating component may be a hydraulic component or the like, or any other conceivable component generating heat.

In other words, there is provided a system in which there are two pump units to control a first flow of coolant and a second flow of coolant, respectively, and to control them in an independent manner. In this manner, it becomes possible not only to improve the overall temperature control of the electric components in the vehicle, but also to provide different cooling temperatures for different components in a simple and cost-efficient manner.

In particular, by the provision of decreasing the temperature of a portion of the coolant to a first temperature and to supply the portion of coolant to the first vehicle heat generating component via the first supply branch of the fluid circuit and decreasing the temperature of a remaining portion of the coolant to the second temperature and to supply the remaining portion of coolant to the second heat generating component via the second supply branch of the fluid circuit, it is possible to provide coolant flows having different properties, e.g. temperature and mass flow, in order to achieve a desired cooling effect for different purposes. In addition, it becomes possible to provide a coolant having a lower temperature for the battery pack than for the first vehicle heat generating component. By providing two parallel coolant flows via the first and second branches, it is thus possible to obtain a lower coolant temperature for the battery pack without the need to use coolant at an unnecessary low temperature for the first vehicle heat generating component.

In general, the first and second pump units in the system are intended for directing and circulating the coolant in the closed circuit. The circulating coolant absorbs heat from the vehicle heat generating components, e.g. the battery pack, and releases heat via the coolant assembly.

Typically, although not strictly required, the fluid circuit is formed by the first supply branch, the second supply branch and a return flow path. In one example, the first supply branch and the second supply branch intersects into the return flow path. However, the fluid circuit may in some example embodiments comprise additional fluid passages, supply branches or the like depending on the configuration of the system, the design of the coolant assembly and the number of components, e.g. the number of vehicle heat generating components.

By way of example, the coolant assembly is configured to decrease the temperature of a first portion of the coolant to the first temperature in a first cooler and to supply the portion of coolant to the first vehicle heat generating component via the first supply branch and further configured to decrease the temperature of a remaining second portion of the coolant to the second temperature in a second cooler and to supply the remaining portion of coolant to the battery pack via the second supply branch. That said, the coolant assembly may not strictly necessarily comprise two separate coolers. Rather, the coolant assembly may be configured to decrease the temperature of the portion of the coolant to the first temperature in a first stage at a first part of the coolant assembly, and to decrease the temperature of the remaining portion of the coolant to the second temperature in a following stage at a second part of the coolant assembly.

Thus, according to one example embodiment, the coolant assembly is configured to decrease the temperature of the portion of the coolant to the first temperature in the first stage at the first part of the coolant assembly, and to decrease the temperature of the remaining portion of the coolant to the second temperature in the following stage at the second part of the coolant assembly. In this example, the first and second parts of the coolant assembly are in fluid communication with each other.

By way of example, the coolant assembly comprises the first cooler configured to supply the portion of the coolant at the first temperature to the first vehicle heat generating component and the second cooler configured to supply the remaining portion of the coolant at the second temperature to the second vehicle heat generating component (i.e. the battery pack), wherein the first cooler and the second cooler are separate components arranged in series in the fluid circuit. In this manner, there is provided an improved cooling of the remaining portion of the coolant, which is cooled by the second cooler, enabling a larger drop in the coolant temperature of the remaining portion of coolant being supplied by the second branch. This type of system is particularly useful a system intended for cooling a battery pack. In this example, the first cooler is arranged upstream of the second cooler and in fluid communication with the second cooler.

Typically, the first cooler has an inlet in fluid communication with the first and second vehicle heat generating components and an outlet in fluid communication with the second cooler and the first pump unit. In addition, the second cooler has an inlet in fluid communication with the first cooler and an outlet in fluid communication with the second pump unit.

According to one example embodiment, the system further comprises a controllable valve for directing the flow of coolant and a heater for heating the coolant, the controllable valve being arranged upstream of the coolant assembly in a return flow path of the fluid circuit. Typically, the first supply branch and the second supply branch intersect into the return flow path upstream of the controllable valve. The controllable valve is in fluid communication with the coolant assembly and the heater. The heater is arranged in a by-pass branch extending from the controllable valve. The heater is also in fluid communication with the controllable valve and any one of second vehicle heat generating component (e.g. the battery pack) and the first vehicle heat generating component, so that the controllable valve can control the flow of coolant to the coolant assembly and the heater.

By way of example, the controllable valve is a non-return valve, check valve or the like. In other examples, the valve may be any one of a pneumatic valve, an electro-magnetic valve, an electro-pneumatic valve or the like.

Typically, although not strictly necessary, the coolant system may comprise an expansion device having an inner volume to allow the coolant to expand with rising temperature and pressure.

According to one example embodiment, the system further comprises a control unit adapted to control the coolant assembly. By way of example, the control unit is adapted to set the level of the first and second temperatures. It should be noted that the control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The coolant assembly is typically arranged in connection with one or several types of fans, adapted to direct air towards the coolant assembly. In other words, the coolant assembly is typically arranged to receive a flow of ambient air. The ambient air flow is being blown by one or several fan(s). In addition, or alternatively, the air flow may arise from the wind speed when driving the vehicle in a forward direction. Thus, in one design variant of the system, the system is provided without a fan, i.e. no fan is used, which means that only wind speed or the environmental temperature difference is used to cool off the coolant assembly.

The first and second coolers may for example be located adjacent to each other such that they may benefit from the same air stream and using the same fan.

According to a second aspect of the present invention, there is provided an electric vehicle thermal management system which comprises a coolant system according to any one of the example embodiments and/or the features as described above in relation to the first aspect of the present invention.

Effects and features of the second aspect are largely analogous to those described above in relation to the first aspect of the present invention.

According to one example embodiment, the electric vehicle thermal management system comprises at least a battery pack and a vehicle heat generating component in fluid communication with the coolant assembly.

According to a third aspect of the present invention, there is provided a vehicle, preferably an electric vehicle, which comprises a coolant system according to any one of the example embodiments and/or the features as described above in relation to the first aspect of the present invention and/or an electric vehicle thermal management system according to any one of the example embodiments and/or the features as described above in relation to the second aspect of the present invention.

Effects and features of the third aspect are largely analogous to those described above in relation to the first aspect of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The various example embodiments of the invention, including its particular features and example advantages, will be readily understood from the following illustrative and non-limiting detailed description and the accompanying drawings, in which.

DETAILED DESCRIPTION OF EXAMPLE EMBODIMENTS OF THE INVENTION

Figure 1A:
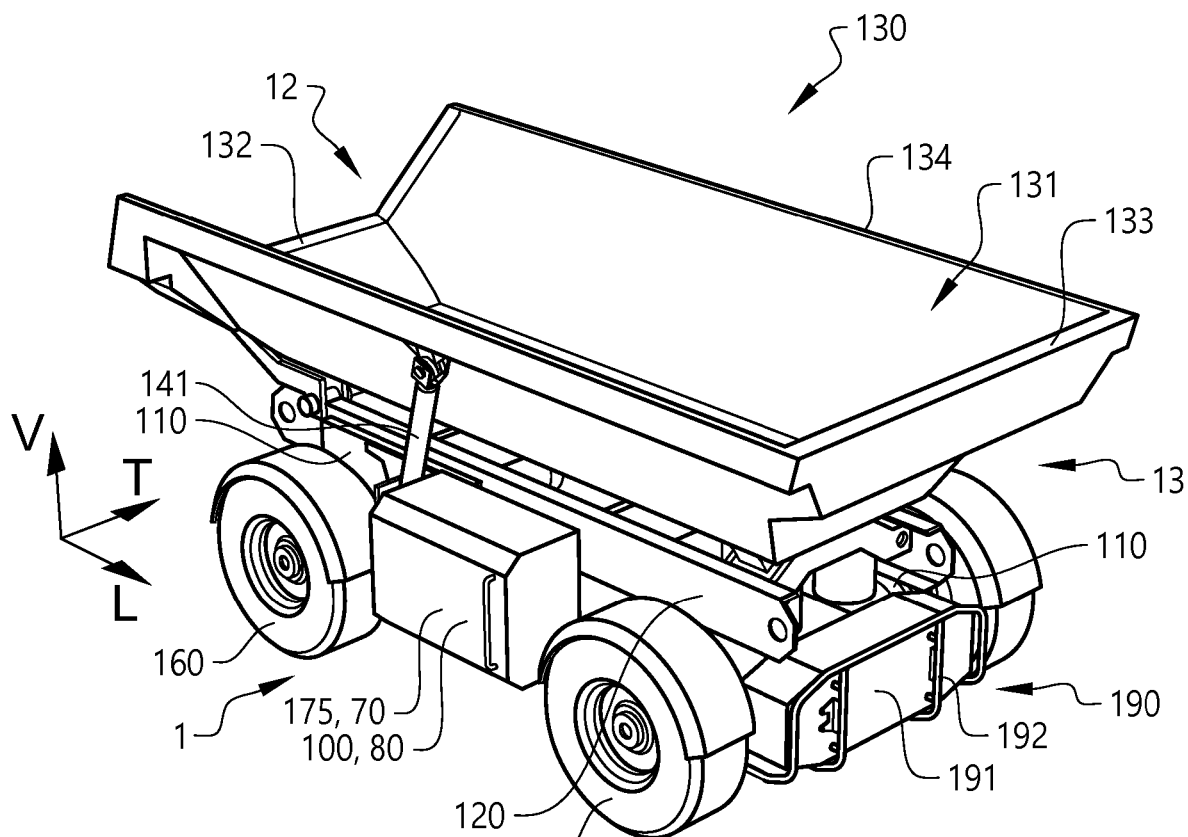
FIG. 1a is a perspective view of a vehicle in the form of an electric-powered working machine including an example embodiment of a coolant system according to the present invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present invention.

Referring now to the figures and e.g. FIG. 1a there is depicted a vehicle in the form of a working machine, in particular an electric-powered automated hauler. The electric-powered automated hauler is a full electric machine. In this type of machine or vehicle, all high voltage components require cooling, e.g. inverters, electric motors and battery packs. In addition, the battery pack is particular sensitive and requires a lower temperature than other components. Thus, the electric vehicle comprises a coolant system 100 according to any one of the example embodiments described hereinafter in relation to the FIGS. 2-3. It should be noted that the vehicle can be of a variety of alternative types, e.g. it may be a bus, car, truck or another type of working machine such as a wheel loader, hauler or the like. In particular, the vehicle may be an electric vehicle, e.g. an electric bus, car, truck or another type of electric working machine such as a wheel loader, hauler or the like.

The coolant system 100 in FIGS. 1a-1b and further components of the system are described in more detail below with reference to FIGS. 2-3.

In the following, a working machine 1 is described. The example embodiment of the coolant system is applicable on any working machines within the fields of industrial construction machines or construction equipment, in particular dumpers/haulers. Hence, although the invention will be described with respect to a hauler, the invention is not restricted to this particular machine, but may also be used in other working machines such as articulated haulers, excavators, backhoe loaders and wheel loaders.

As seen in FIG. 1a, the working machine comprises a dump body 130 for accommodating a load. Merely as an example, and as is indicated in FIG. 1a, the dump body 130 may be a loading platform of the working machine 1. The working machine 1 is adapted to have a load receiving condition in which the dump body 130 comprises an open load receiving area 131 outwardly delimited by a load receiving area circumference 134. In FIG. 1a an embodiment is shown where the working machine 1 is adapted to assume the load receiving condition in a normal state. In other words, the working machine 1 embodiment illustrated in FIG. 1a comprises the dump body 130 which comprises an open load receiving area 131 outwardly delimited by a load receiving area circumference 134. However, it is also envisioned that embodiments of the working machine may comprise cover means (not shown), such as a lid, that is adapted to cover at least a portion of the dump body 130.

The working machine in this example has no driver seat, but is intended to be autonomously and/or remotely driven. The working machine 1 further comprises a load dumping side 12 and an opposite side which herein referred to as the opposite side 13. The opposite side 13 may be used as a front end side when the machine is driven in the direction that puts the opposite side 13 first. However, the working machine 1 may be drivable in any direction, i.e. it is bidirectional. Further, the dump body 130 comprise a load dumping end portion 132 arranged on the working machines load dumping side 12, and an opposite end portion 133 arranged on the working machines opposite side 13.

Further, still referring to FIG. 1a, the working machine 1 comprise a working machine frame 120 to which a pair of propulsion axles 110 are mounted. The working machine frame 120 further supports the dump body 130, and thereby carries the load of anything contained in the dump body 130 as well as the weight from the dump body itself. The propulsion axles 110 are equipped with a propulsion hub (not shown) for driving propulsion means 160. In the figures the propulsion means 160 are illustrated as wheels, however, they may also be crawler tracks.

Figure 1B:
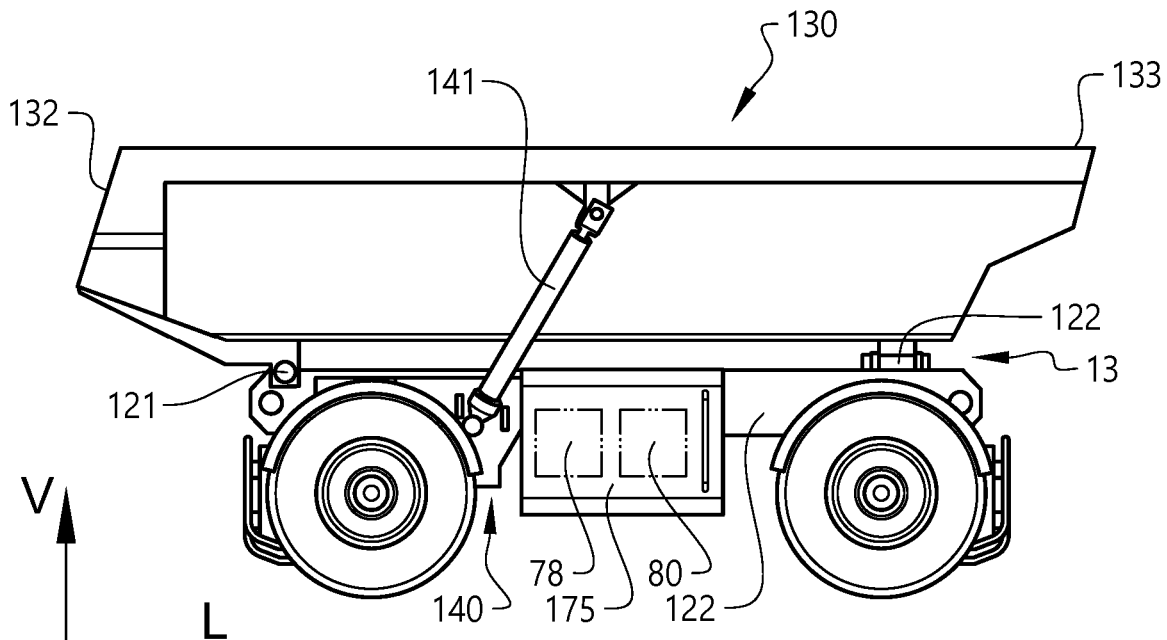
FIG. 1b is a side view of a working machine according to one embodiment of the invention.

Further, although not explicitly shown in the FIGS. 1a and 1b, an electrical motor is installed onto the propulsion axle 110 being coupled to a drive shaft (not shown). The electrical motor is mounted onto a front side of the elongated main body of the propulsion axle 110. The front side faces away from a centre of the working machine 1. The working machine may comprise one electrical motor on each machine axle 110. It should be noted that the electric motor is one type of a vehicle heat generating component, as further described below.

Moreover, the working machine 1 may comprise a tilting arrangement 140, such as a tilting arrangement comprising one or more tilting actuators 141, e.g. hydraulic actuators, for tilting the dump body 130 of the working machine 1. The tilting arrangement 140 is in one end attached to the frame 120 and in the other end to the dump body 130. Typically, the tilting arrangement 140 comprises two tilting actuators 141 arranged at different sides of the dump body to ensure a stable tilting.

As can be seen in FIG. 1a, the working machine also has an electrical control arrangement 175, which is arranged to the frame of the working machine 1. The electrical control arrangement 175 may comprise (as illustrated in FIG. 1b) a power source e.g. a battery pack 80, for supporting the electrical motor(s) and any other components with power. The battery pack may thus be a traction battery pack. The battery pack may have a line voltage of 400V, 600V or any other suitable line voltage. Further, the electrical control arrangement 175 may comprise a control unit 78 for controlling the working machine. The control unit 78 may be capable of receiving a remote control signal to enable the working machine to be remotely controlled. Such a signal may be received from an external transmission unit (not shown). It may further be capable of communicating any information to or from the working machine from or to a remote server (not shown). Such information may comprise usage data, service information, battery status, load, weight, capacity utilization or any other relevant information.

Figure 2:
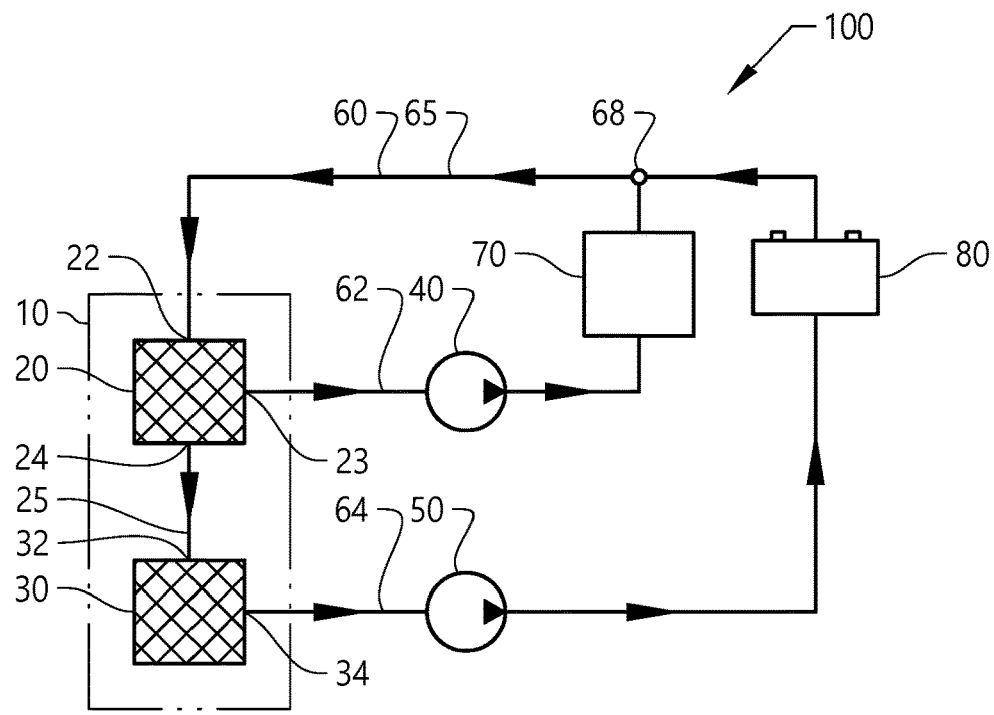
FIG. 2 schematically illustrates an example embodiment of a coolant system for a vehicle according to the present invention, wherein the coolant system comprises a coolant assembly.
Figure 3:
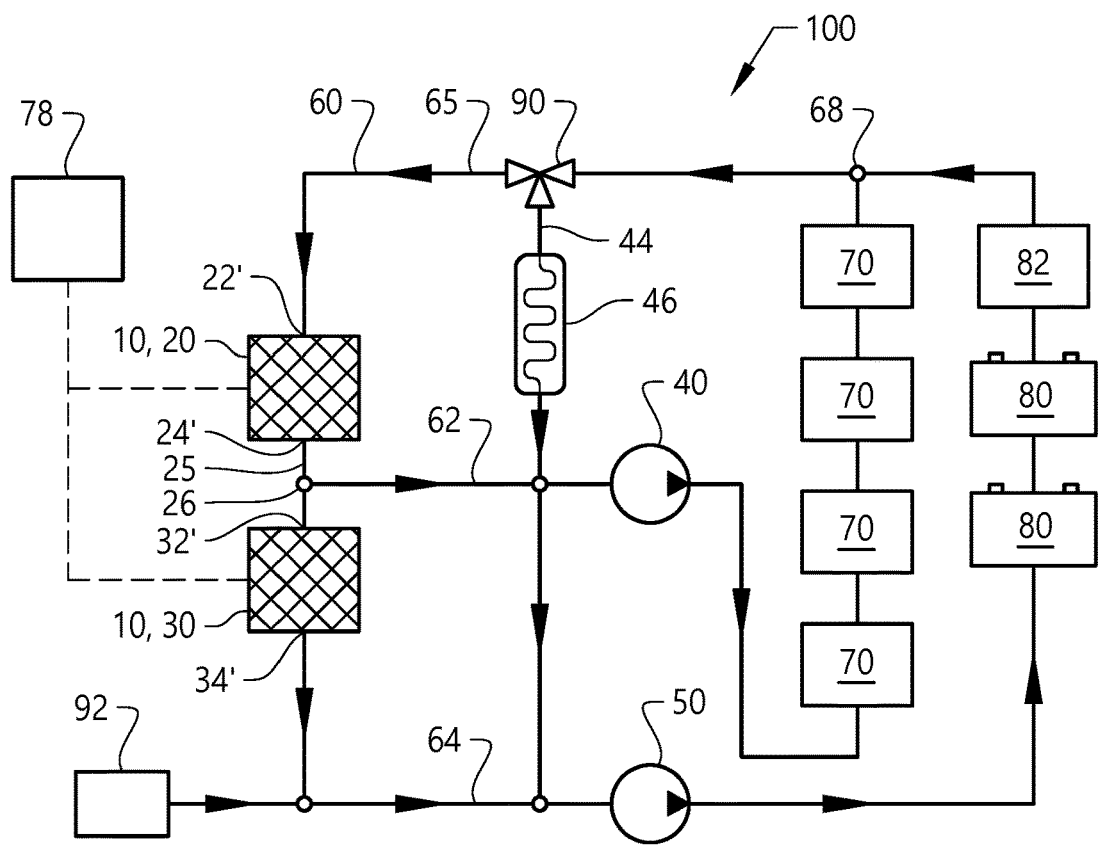
FIG. 3 schematically illustrates another example embodiment of a coolant system for a vehicle according to the present invention, wherein the coolant system comprises a coolant assembly.

Besides the battery pack, the working machine in this example also comprises one or several other heat generating components 70, as will be further described in relation to FIGS. 2 and 3. For ease of reference, a vehicle heat generating component may sometimes be denoted as a heat generating component, heat component or as a vehicle heat generating component and the like.

The propulsion axle arrangement 110 may also have a cover 190 for covering the electrical engine. In this example, the cover arrangement comprises a first (inner) cover 191 and a second cover 192 being arranged on the outside of the first cover.

Turning to FIG. 1b, which is a side view of the same embodiment of the vehicle, the working machine frame 120 is illustrated as being coupled the propulsions means 160, i.e. the wheels, (via the propulsion axle, which is not seen in this view). Further, the illustration shows that the dump body 130 rests on the working machine frame 120. However, in the illustrated embodiment, it is not in contact with the frame 120 during its whole length, but rather at the load dumping side 12 at an attachment means 121 being a pivotal arrangement allowing the dump body 130 to pivot relative the frame 120. The dump body 130 further rests on the frame 120 at a guiding plate portion 122. Further, the tilting arrangement 140, with one of the side's tilting actuators 141 is shown in FIG. 1b. The tilting actuator 141 is in one end attached to the frame 120 and in the other end to the dump body 130. Further, the tilting actuator may be extended so that the dump body's opposite end portion 133 is elevated. Typically, the tilting arrangement 140 comprise two tilting actuators 141 arranged at different sides of the dump body to ensure a stable tilting, and to spread the load on two actuators enabling a lower dimension of the tilting actuators for the same load.

As is also clearly shown in FIG. 1a, the working machine 1 extends in at least a longitudinal direction L, a vertical direction V and a transversal direction T. The longitudinal direction L is parallel to an intended direction of travel of the working machine 1. Further the transversal direction T is perpendicular to each one of the vertical direction V and the longitudinal direction L. That is, the transversal direction T is parallel to the general extension of the propulsion axles 110. These directions are intended to be interpreted relative the working machine, and should not be interpreted as being dependent of the vehicle's orientation.

Moreover, the working machine 1 as described above in relation to FIGS. 1a and 1b, comprises a coolant system 100 for cooling one or several types of vehicle heat generating components, as will be further described below.

Turning now to FIG. 2, there is depicted an example embodiment of a coolant assembly for the vehicle described above in relation to FIGS. 1a and 1b. It should be readily appreciated that the example embodiments described herein may also be installed in other types of electric vehicles, electric working machines or the like. For ease of reference, the coolant system may sometimes be denoted as the system 100.

As illustrated in the FIG. 2, the vehicle comprises at least a first vehicle heat generating component 70 and a second vehicle heat generating component 80. In this example, the second vehicle generating component is a battery pack 80. In this context, the term "vehicle heat generating component" refers to a vehicle component that generates thermal energy or heat, e.g. during an operational state of the vehicle. This type of vehicle component typically needs to be cooled in order to guarantee its function in the vehicle. The vehicle heat generating component is located on or in the vehicle. Examples of vehicle heat generating components are battery packs, electronic devices, electronic circuits, inverters, including power inverters, i.e. devices that use the battery pack to power electrical appliances, electric motors, DC/DC converters, on-board chargers, hydraulic components, combustion engine(s), charge air coolers (cac), air conditioning systems etc.

Referring again to FIG. 2, the coolant system 100 comprises a fluid circuit 60 configured to define a fluid passageway for circulating a coolant there through. The fluid circuit is here provided in the form of a first supply branch 62 and a second supply branch 64. The fluid circuits including the first supply branch 62 and the second supply branch 64 is considered as a common fluid circuit for the vehicle heat generating components, e.g. the battery pack 80 and the first vehicle heat generating component 70. The coolant, in the example embodiments described herein, is a liquid fluid medium. Accordingly, the term "fluid" in the context of these example embodiments refers to a liquid fluid. The type of coolant may, however, vary depending on type of vehicle and type of installation. Typically, the coolant is water-based. By way of example, the coolant is water-based with the addition of glycols to prevent freezing and other additives to limit corrosion, erosion and cavitation etc.

The liquid coolant may accordingly be water blended with ethylene glycol, ammonia, or any other suitable liquid coolant. The coolant may also be an oil, or a combination of oil and a water-based fluid. In another example, the coolant may be a fluid such as a gas.

In other words, in this example, it should be noted that the system also comprises the coolant. In addition, the coolant in this example is contained in the fluid circuit 60.

Accordingly, in the fluid circuit 60 (solid lines in FIG. 2 and FIG. 3) a liquid coolant is transportable, typically with the aid of pump units 40 and 50, as further described below.

Moreover, the coolant system 100 comprises a coolant assembly 10 arranged in the fluid circuit, which is further described hereinafter. The coolant assembly is typically configured to discharge the heat to the ambient atmosphere so as to cool the coolant.

It should be readily appreciated that the flow of coolant is in a direction from the coolant assembly to the vehicle heat generating components, and then in a direction from the vehicle heat generating components to the coolant assembly, as indicated by the arrows in e.g. FIG. 2 and also in FIG. 3.

The coolant assembly 10 is configured to decrease the temperature of a portion of the coolant to a first temperature and to supply the portion of coolant to the vehicle heat generating component via the first supply branch 62 and further configured to decrease the temperature of a remaining portion of the coolant to a second temperature and to supply the remaining portion of coolant to the battery pack via the second supply branch 64.

The system further comprises a first pump unit 40 arranged downstream of the coolant assembly in the first supply branch 62 and in fluid communication with the coolant assembly and the vehicle heat generating component.

The first pump unit 40 is configured to direct the portion of coolant to the first vehicle heat generating component.

Moreover, the system comprises a second pump unit 50. The second pump unit 50 is arranged downstream of the coolant assembly in the second supply branch 64 and in fluid communication with the coolant assembly and the battery pack 80 (the second heat generating component). The second pump unit is configured to direct the remaining portion of coolant to the battery pack.

It should be noted that in the context of the example embodiments, the terms "downstream" and "upstream", as used herein, are terms that indicate a direction relative to the flow of the coolant through the fluid circuit 60. As such, the term "downstream" refers to a direction that generally corresponds to the direction of the flow of coolant, and the term "upstream" generally refers to the direction that is opposite of the direction of flow of the coolant. By way of example, the term "downstream" refers to a direction that generally corresponds to the direction of the flow of coolant from the coolant assembly, and the term "upstream" generally refers to the direction that is opposite of the direction of flow of the coolant from the coolant assembly. The direction of flow of the coolant is indicated with arrows in the FIGS. 2 and 3.

In other words, there is provided a system in which there is two pump units adapted to control a first flow of coolant and a second flow of coolant, respectively, and in an independently manner.

In particular, in this example embodiment there is provided a coolant system in which the coolant assembly includes two spaced apart cooler 20 and 30. Hence, the coolant assembly has a first cooler 20 and a second cooler 30. That is, in the example embodiment as illustrated in FIG. 2, the coolant assembly 10 comprises the first cooler 20 configured to supply the portion of the coolant at the first temperature to the vehicle heat generating component and the second cooler 30 configured to supply the remaining portion of the coolant at the second temperature to the battery pack (the second vehicle component). Further, the first cooler 20 and the second cooler 30 are separate components arranged in series in the fluid circuit 60. Moreover, as illustrated in FIG. 2, the first cooler 20 is arranged upstream of the second cooler 30 and in fluid communication with the second cooler.

Accordingly, the system described in relation to FIG. 2 includes the first pump unit 40 being arranged downstream of the first cooler 20 in the first supply branch 62 of the fluid circuit. The first pump unit 40 is in fluid communication with the first cooler and the first vehicle component so that the pump unit 40 is capable of directing coolant from the first cooler to the first vehicle component 70. In other words, the first pump unit 40 is positioned in-between the first cooler 20 and the first vehicle component 70.

Analogously, the second pump unit 50 is arranged downstream of the second cooler 30 in the second supply branch 64 of the fluid circuit. The second pump unit 50 is in fluid communication with the second cooler 30 the battery pack 80 so that the second pump unit 50 is capable of directing coolant from the second cooler 30 to the battery pack 80. In other words, the second pump unit 50 is positioned in-between the second cooler 30 and the battery pack 80.

In this manner, by the arrangement of the first cooler, the second cooler and the first and second pump units, respectively, and as described above in relation to FIG. 2, the coolant assembly is configured to supply the portion of the coolant to the first vehicle heat generating component 70 and the remaining portion of the coolant to the battery pack 80.

The pump units may be electrically driven and/or driven by a belt or hydraulically by another machine in the vehicle. Liquid coolant is thus transported by the pump units to the vehicle components, respectively, as described herein.

It should be readily appreciated that the coolant assembly in FIG. 2 may be provided as a single unit comprising the first cooler 20 and the second cooler 30. Typically, as described in relation to the example embodiment of FIG. 2 above, the coolant assembly is a single unit comprising spaced apart first cooler 20 and second cooler 30 in fluid communication with each other. That is, the coolant assembly is provided in the form of an integral unit having spaced apart first cooler 20 and second cooler 30 in fluid communication with each other. However, the example embodiments of the coolant system may be provided in other ways as long as the coolant assembly can be configured to decrease the temperature of a portion of the coolant to the first temperature and to supply the portion of coolant to the first vehicle heat generating component via the first supply branch and further configured to decrease the temperature of a remaining portion of the coolant to the second temperature and to supply the remaining portion of coolant to the second vehicle heat generating component via the second supply branch.

Another example of a coolant assembly according to another example embodiment is described in relation to FIG. 3. In this system, the coolant assembly comprises two spaced apart coolers 20, 30 that are separate units. That is, each one of the coolers 20, 30 is provided in the form of a single unit. Still, the first cooler 20 and the second cooler 30 are separate components arranged in series in the fluid circuit 60. Moreover, as illustrated in FIG. 3, the first cooler 20 is arranged upstream of the second cooler 30 and in fluid communication with the second cooler. The example of the coolant system in FIG. 3 is described further below.

Now, returning to FIG. 2 and the configuration of the example embodiment including a single unit coolant assembly including the first cooler and the second cooler, the first cooler 20 has an inlet 22 in fluid communication with a return flow path 65. In this example, the first supply branch 62 and the second supply branch 64 intersects into the return flow path 65. For example, as illustrated in FIG. 2, the first supply branch 62 and the second supply branch 64 intersects into the return flow path 65 at a location 68 of the fluid circuit 60.

The coolant system is thus arranged such that the coolant flowing in the first supply branch 62 is returned to the coolant assembly downstream the vehicle component 70, while the flow of coolant in the second supply branch 64 is returned to the coolant assembly downstream the vehicle component 80. In the return flow path 65, the portion of coolant in the first supply branch 62 is mixed with the remaining coolant flow from the second supply branch 64 such that both the flow from the first and second supply branches are mixed before returning to the coolant assembly 10. The return flow path 65 is thus used as a common inflow to the coolant assembly 10 for the two supply branches 62, 64.

In the example described in relation to FIG. 2, the first cooler 20 has the inlet 22 being in fluid communication with the first and second vehicle heat generating components, respectively.

Moreover, the first cooler has an outlet 24 in fluid communication with the second cooler. In this example, the first cooler 20 further has another outlet 23 in fluid communication with the first pump unit 40. However, in another example, the first cooler 20 may only have one single outlet for fluidly communicating with the second cooler 30 and the first pump unit. In yet another example, e.g. as shown in FIG. 3, the first cooler 20 has an outlet in fluid communication with the second cooler 30 and the first pump unit 40 via a fluid passage that is divided into separate fluid passages for the second cooler 30 and the first pump unit 40, respectively. Accordingly, one and the same outlet of the first cooler may be in fluid communication with both the second cooler and the first pump unit. In other words, the type of fluid communication connection from the first cooler 20 to the second cooler 30 and the first pump unit 40 may vary depending on the design of the coolant assembly 10.

Turning again to the example embodiment in FIG. 2, the first cooler 20 and the second cooler 30 are in fluid communication via an inter-connecting fluid passage 25. That is, the inter-connecting fluid passage 25 inter-connects the outlet 24 of the first cooler 20 with an inlet 32 of the second cooler 30. To this end, the second cooler has the inlet 32 being in fluid communication with the first cooler 20 and an outlet 34 being in fluid communication with the second pump unit 50.

The first branch 62 in this example embodiment extends from inlet 23 of the first cooler 20. The inlet 23 is thus in fluid communication with the first pump unit 40. In this example, the second branch 64 extends from the outlet 34 of the second cooler 30. That is, the outlet 34 of the second cooler 30 is in fluid communication with the second pump unit 50.

As mentioned above, the coolant assembly 10 is configured to decrease the temperature of a portion of the coolant to the first temperature in the first cooler 20 and to supply the portion of coolant to the first vehicle heat generating component via the first supply branch 62 and further configured to decrease the temperature of a remaining portion of the coolant to the second temperature in the second cooler 30 and to supply the remaining portion of coolant to the battery pack via the second supply branch 64. In other words, the coolant assembly is configured to decrease the temperature of the portion of the coolant to the first temperature in a first stage at a first part of the coolant assembly, and to decrease the temperature of the remaining portion of the coolant to the second temperature in a following stage at a second part of the coolant assembly. As mentioned above, it should be readily appreciated that the first and second parts of the coolant assembly are in fluid communication with each other. For instance, the first and second parts of the coolant assembly are in fluid communication with each other via an internal fluid passage of the coolant assembly. However, the first and second parts of the coolant assembly may be in fluid communication with each other in other ways.

Regarding the first temperature and the second temperature, it should be readily appreciated that the second temperature is a lower temperature than the first temperature. The various temperatures may be measured by temperature sensors (not shown) arranged in the system. That is, the measured temperature may be measured by means of a temperature measuring device. In addition, data indicative of the temperatures may be transferred to a control unit, as mentioned hereinafter.

In the context of the example embodiments, it is to be noted that the battery pack typically requires a lower coolant temperature than other vehicle heat generating components such as electric components, and also lower coolant temperature than e.g. internal combustion engines.

The system as described above in relation to FIG. 2 will provide two temperature levels. In other words, the system provides one level for the first vehicle heat generating component 70 via coolant in the first supply branch 62. The first vehicle heat generating component may be an inverter, electrical machine (EM) or the like. The first supply branch (or part of the circuit) may for example have an inlet temperature of approximate 65-70 degrees C. It should be noted that other temperature intervals are likewise conceivable. In addition, the system provides another temperature level for the second vehicle heat generating component 80 via coolant in the second supply branch 64. The second vehicle heat generating component may be the battery pack, i.e. a battery circuit. The second supply branch (or part of the circuit) may for example have an inlet temperature of approximate 40-50 degrees C. It should be noted that other temperature intervals are likewise conceivable.

By way of example, the cooler is a heat exchanger, e.g. a radiator. In general, each one of the first cooler and the second cooler is adapted to at least transfer thermal energy from one medium to another for the purpose of cooling the coolant supplied to it. The heat exchanger should be dimensioned in view of the function, space and installation in the vehicle. Radiators can be provided in several different ways and are commercially available in various configurations.

Generally, the pump units in the system are intended for directing and circulating the coolant in the closed circuit. The circulating coolant absorbs heat from heat generating components, e.g. the battery pack, and releases heat via the coolant assembly, e.g. the first cooler and the second cooler. In other words, once the coolant has passed through the vehicle component, e.g. the battery pack, the coolant is circulated through the coolant assembly (first and second coolers) where heat is transferred to ambient air flow. Typically, although not strictly necessary, the ambient air flow is being blown by one or several fan(s).

The first cooler and the second cooler are typically air-to-coolant heat exchangers in which a fan is used to produce an air flow through the heat exchangers in order to cool the coolant. As the first and second coolers are arranged in close proximity to each other, they may be cooled at least partially by the same air flow. Hence, the first and the second coolers are in this example arranged to be cooled by a common air flow fan. By such an arrangement only one fan may be needed.

Thus, the system may also include one or several fans behind the coolant assembly in order to improve the cooling performance. The fan is adapted to direct or force air through the cooler such as a radiator, when insufficient air is passing through the radiator to achieve the desired level of cooling, for example when the vehicle is not moving. By way of example, the system comprises one fan configured to direct air towards the coolant assembly. In another example, the system comprises a plurality of fans arranged in series, on in parallel, each one being configured to direct air towards the coolant assembly. In yet another example, when the coolant assembly includes the first cooler and the second cooler, there is one fan arranged in connection with each one of the coolers. That is, the system comprises a first fan configured to direct air towards the first cooler and a second fan configured to direct air towards the second cooler. The arrangement of the fan(s) can be varied in several different manners. In addition, there are several different types of fans. However, the fan, its components and configurations of the fan are well-known components and thus not further described herein.

It should be readily appreciated that the battery pack 80 is typically also cooled by circulation of water based coolant through cooling passages within the battery structure of the battery pack.

The coolant can be used to remove heat from the battery pack and also to provide heating of the pack for fast charging at low temperatures, and/or for more rapid cold start.

Regarding other types of vehicle heat generating components, some of them may further be mounted to cold plates (not shown), which are used to transfer the heat away from the electronics and into the liquid coolant contained in the fluid circuit.

Referring now to FIG. 3, there is depicted another example embodiment of the coolant system, which is intended for installation in a vehicle as described in relation to FIG. 1a above, or in any other type of vehicle or working machine.

Turning again to the example embodiment in FIG. 3, the first cooler 20 and the second cooler 30 are in fluid communication via an inter-connecting fluid passage 25'. That is, the inter-connecting fluid passage 25' inter-connects an outlet 24' of the first cooler 20 with an inlet 32' of the second cooler 30.

In the example depicted in FIG. 3, including the spaced apart first cooler and second cooler as separated components, the first cooler 20 has an inlet 22' in fluid communication with the return flow path 65 and an outlet 24' in fluid communication with the second cooler 30 and the first pump unit 40. That is, the first cooler 20 has the inlet 22' being in fluid communication with the first and second vehicle heat generating components 70, 80. Further, in this example, when the system includes a number of vehicle heat generating components 70, the first cooler 20 has the inlet 22' being in fluid communication with the number of the vehicle heat generating components 70, 80. In addition, as illustrated in FIG. 3, one and the same outlet 24' of the first cooler is in fluid communication with both the second cooler 30 and the first pump unit 40.

Moreover, the first branch 62 in this example embodiment extends from the inter-connecting fluid passage 25' connecting the first cooler 20 with the second cooler 40, as shown in FIG. 3. The first branch 62 extends from a location 26 on the inter-connecting fluid passage 25 to the first pump unit 40. In this example, the second branch 64 extends from an outlet 34' of the second cooler 30. That is, the outlet 34' of the second cooler 30 is in fluid communication with the second pump unit 50. In other words, the second cooler 30 has the inlet 32' in fluid communication with the first cooler 20 and the outlet 34' in fluid communication with the second pump unit 40.

In the example embodiment described in relation to FIG. 3, the first cooler 20 is configured to decrease the temperature of the (first) portion of the coolant to the first temperature and to supply the portion of coolant to the first vehicle heat generating component 70 via the first supply branch 62 of the fluid circuit 60. Further, the second cooler 30 is in this example configured to decrease the temperature of the remaining portion of the coolant to a second temperature and to supply the remaining portion of coolant to the second vehicle heat generating component 80 via the second supply branch 64 of the fluid circuit.

As mentioned above with respect to the example in FIG. 2, also the system in FIG. 3 comprises the first pump unit 40 being arranged downstream of the coolant assembly in the first supply branch 62 and in fluid communication with the coolant assembly and the first vehicle heat generating component. In other words, for this example, the first pump unit 40 is arranged downstream of the first cooler 20 in the first supply branch 62 and in fluid communication with the first cooler 20 and the first vehicle heat generating component 70. Analogously, the system in FIG. 3 comprises the second pump unit 50 being arranged downstream of the coolant assembly in the second supply branch 64 and in fluid communication with the coolant assembly and the second vehicle heat generating component 80. In other words, in this example, the second pump unit 50 is arranged downstream of the second cooler 30 in the second supply branch 64 and in fluid communication with the second cooler 30 and the second vehicle heat generating component 80.

Optionally, the system further comprises a controllable valve 90 for directing the flow of coolant and a heater 46 for heating the coolant. In FIG. 3, the controllable valve 90 is arranged upstream of the coolant assembly in the return flow path 65 of the fluid circuit 60. In other words, the controllable valve 90 is arranged upstream of the first cooler 20 and in the return flow path 65 of the fluid circuit 60. As can be seen in the example illustrated in FIG. 3, the first supply branch 62 and the second supply branch 64 intersects into the return flow path 65 upstream of the controllable valve 90. The controllable valve is in fluid communication with the coolant assembly 10 and the heater 46. In addition, the heater 46 is arranged in a by-pass branch 44 extending from the controllable valve 90. Typically, the by-pass branch 44 extends from the controllable valve 90 to any one of the first and second supply branches 62 and 64. Further, the heater 46 is in fluid communication with the controllable valve 90 and any one of the battery pack 80 and the vehicle heat generating component 70. In this manner, the controllable valve can control the flow of coolant to the coolant assembly 10 and the heater 46. In the example described in relation to FIG. 3, the heater 46 is in fluid communication with the controllable valve 90 and both the battery pack 80 and the vehicle heat generating component 70. In this manner, the controllable valve can control the flow of coolant to the coolant assembly 10 and the heater 46. As such, the by-pass branch 44 extends from the controllable valve 90 to the first and second supply branches 62 and 64, respectively. In another example (not illustrated), the heater 46 is in fluid communication with the controllable valve 90 and the battery pack 80, only. Hence, in this example, the heater 46 is arranged in a by-pass branch 44 extending from the controllable valve 90 to the second supply branch 64. The heater may be an electric heater which uses the same line voltage as the other electric components in the vehicle, which line voltage is usually 24 V for trucks, busses and construction equipment and 12V for passenger cars. In addition, the line voltage may in other examples be 400 V, 600 V. The controllable valve can be provided in the form of an on/off valve, non-return valve, check valve or the like.

In other words, the system according to this example embodiment is designed such that the controllable valve is disposed in the return flow path 65 and arranged to receive the return flow of coolant from the first and second vehicle heat generating components, respectively.

Typically, although strictly necessary, the coolant system 100 may comprise an expansion device 92 to allow the coolant to expand with rising temperature and pressure. By way of example, as depicted in FIG. 3, the expansion device is in fluid communication with the second branch 64. Hence, the second cooler 2 is in fluid communication with the expansion device 92. The expansion device can be designed in several different manners. As an example the device 92 has an inner volume for containing the coolant. That is, in one example, the coolant system 100 comprises the expansion device 92 having an inner volume to allow the coolant to expand with rising temperature and pressure.

Similar as to the system described in relation to FIG. 2, the system as described above in relation to FIG. 3 will provide two temperature levels. In other words, the system in FIG. 3 provides one level for the set of the first vehicle heat generating components 70 via coolant in the first supply branch 62. The first vehicle heat generating components may be any one of an inverter, electrical machine (EM) or the like. The first supply branch 62 (or part of the circuit) may for example have an inlet temperature of approximate 65-70 degrees C. It should be noted that other temperature intervals are likewise conceivable. In addition, the system provides another temperature level for the set of the second vehicle heat generating components 80 via coolant in the second supply branch 64. The second vehicle heat generating component may typically be a number of battery packs, i.e. a battery circuit. The second supply branch 64 (or part of the circuit) may for example have an inlet temperature of approximate 40-50 degrees C. It should be noted that other temperature intervals are likewise conceivable.

Optionally, as depicted in FIG. 3, there is also another vehicle heat generating component 82 disposed in the second supply branch 64. In this example, the vehicle heat generating component 82 is disposed downstream of the second vehicle heat generating component 80 in the second supply branch 64.

The controllable valve 90 is configured to control the flow of coolant and to control if the vehicle heat generating components need to be cooled or heated. If the vehicle heat generating components 70, 80, 82 need to be heated, the controllable valve 90 is configured to direct the flow of coolant to the heater rather than returning the coolant to the coolant assembly 10. If the vehicle heat generating components need to be cooled, the controllable valve 90 will direct the flow to the coolers 20 and 30, respectively. Furthermore, if the controllable valve 90 has directed the flow to the heater 46 in the by-pass branch 44, both pumps 40 and 50 will take coolant after the heater. If the controllable valve 90 has directed the flow to the first and second coolers 20 and 30, then the pump unit 40 takes coolant between the coolers 20 and 30, meaning that this coolant has only passed one cooler 20. The flow from pump 40 is then entering the vehicle heat generating components 70 (e.g. an inverter and an EM circuit). Analogously, the pump unit 50 takes the coolant after the cooler 30, meaning that this coolant has passed both coolers 20 and 30 to lower the temperature of the coolant as much as possible. After the flow from both pump units 40 and 50 have passed their circuits the flows are summed up to one flow before the controllable valve 90 in the return path 65. By this arrangement it becomes possible to supply coolant to various vehicle heat generating components having different coolant demands. By way of example, if one of the circuits of vehicle heat generating components has a high cooling demand and the other one has low cooling demand, it becomes possible by the example embodiments of the coolant system to deliver different coolant temperature to the circuit of vehicle heat generating components. The circuit of component with low demand will aid the circuit of component with high demand because of the mixture of coolant temperatures. Another example advantage with the system 100 is that flow of coolant through the first cooler 20 is higher than the flow of coolant through the second cooler 30, partly because the first cooler 20 should reduce as much energy as possible. Reducing energy is considered easier when the temperature between the air and the coolant is greater. Because of the higher flow through the first cooler 20, the temperature difference between inlet 22 (and inlet 22' in FIG. 3) and outlet 24 (and outlet 24' in FIG. 3) for the first cooler 20 is lower. In this manner, the first cooler 20 is set to operate with a higher utilization. The other cooler, the second cooler 30 is then set to reduce the temperature of the remaining coolant flowing through the second cooler 30 as much as possible to deliver the low temperature coolant to the second heat generating component 80, i.e. the battery circuit.

Furthermore, as illustrated in the example embodiment in FIG. 3, the system 100 comprises the control unit 78. The control unit is connectable to the coolant assembly. That is, the control unit 78 is adapted to control the coolant assembly. By way of example, the control unit is adapted to set the level of the first and second temperatures, as mentioned above. The control unit 78 may also communicate with the controllable valve 90 so as to control the valve, as mentioned above. By way of example, the control unit is adapted to control the valve to selectively direct the flow of fluid to the coolant assembly and the heater in the by-pass branch.

In addition, or alternatively, the control unit is a part of another system in the vehicle. For instance, the vehicle comprises the control unit to perform the operational steps of controlling the coolant system in order to perform the temperature control according to the example embodiments as described herein. In other designs of the system and the vehicle, the control unit may be arranged in another remote location of the vehicle.

As mentioned above, the example embodiments of the coolant system 100 as described in relation to FIGS. 2 and 3 are to be installed in a vehicle, e.g. an electric vehicle, in particular an electric machine as described in relation to FIGS. 1*a*-1*b*. Thus, the vehicle, preferably an electric vehicle, comprises the coolant system according to any one of the example embodiments as described above in relation to FIGS. 2 and 3. In addition, or alternatively, the vehicle, preferably an electric vehicle, comprises an electric vehicle thermal management system having a coolant system according to any one of the examples above and at least including the battery pack and a vehicle heat generating component in fluid communication with the coolant assembly. However, it should be noted that the electric vehicle thermal management system and/or the coolant system may include a number of vehicle heat generating components, and not only two vehicle heat generating components.

It is to be understood that the present invention is not limited to the embodiments described above and illustrated in the drawings; rather, the skilled person will recognize that many changes and modifications may be made within the scope of the appended claims.

The invention claimed is:

1. A coolant system for an electric vehicle, the vehicle comprising at least a first vehicle heat generating component and a second vehicle heat generating component, said coolant system comprising:
a fluid circuit configured to define a fluid passageway for circulating a coolant therethrough; and
a coolant assembly arranged in said fluid circuit, wherein said coolant assembly is configured to decrease the temperature of a portion of the coolant to a first temperature and to supply the portion of coolant to the first vehicle heat generating component via a first supply branch of the fluid circuit and further configured to decrease the temperature of a remaining portion of the coolant to a second temperature and to supply the remaining portion of coolant to the second vehicle heat generating component via a second supply branch of the fluid circuit;
said coolant system further comprising a first pump unit arranged downstream of said coolant assembly in said first supply branch and in fluid communication with said coolant assembly and said first vehicle heat generating component, said first pump unit being configured to direct said portion of coolant to said first vehicle heat generating component, and a second pump unit arranged downstream of said coolant assembly in said second supply branch and in fluid communication with said coolant assembly and said second vehicle heat generating component, said second pump unit being configured to direct said remaining portion of coolant to said second vehicle heat generating component; and
wherein said coolant system further comprises a controllable valve for directing the flow of coolant and a heater for heating the coolant, said controllable valve being arranged upstream of said coolant assembly in a return flow path of said fluid circuit, said first supply branch and said second supply branch intersecting into said return flow path upstream of said controllable valve, said controllable valve further being in fluid communication with said coolant assembly and said heater, and said heater being arranged in a by-pass branch extending from said controllable valve and in fluid communication with said controllable valve and any one of the first vehicle heat generating component and the second vehicle heat generating component, so that said controllable valve can control the flow of coolant to the coolant assembly and the heater.

2. A coolant system according to claim 1, wherein said coolant assembly is configured to decrease the temperature of the portion of the coolant to the first temperature in a first stage at a first part of the coolant assembly, and to decrease the temperature of the remaining portion of the coolant to the second temperature in a following stage at a second part of the coolant assembly, said first and second parts of the coolant assembly being in fluid communication with each other.

3. A coolant system according to claim 1, wherein said coolant assembly comprises a first cooler configured to supply the portion of the coolant at the first temperature to the first vehicle heat generating component and a second cooler configured to supply the remaining portion of the coolant at the second temperature to said second vehicle heat generating component, wherein the first cooler and the second cooler are separate components arranged in series in the fluid circuit, the first cooler being arranged upstream of said second cooler and in fluid communication with said second cooler.

4. A coolant system according to claim 3, wherein said first cooler has an inlet in fluid communication with said first and second vehicle heat generating components, respectively, and an outlet in fluid communication with the second cooler and the first pump unit, while said second cooler having an inlet in fluid communication with the first cooler and an outlet in fluid communication with the second pump unit.

5. A coolant system according to claim 1, wherein the coolant system comprises an expansion device having an inner volume to allow the coolant to expand with rising temperature and pressure.

6. A coolant system according to claim 1, wherein the second vehicle heat generating component is a battery pack.

7. A coolant system according to claim 1, wherein said system further comprises a control unit adapted to control said coolant assembly.

8. A coolant system according to claim 7, wherein said control unit is adapted to set the level of the first and second temperatures.

9. An electric vehicle thermal management system comprising a coolant system according to claim 1 and at least a battery pack and a vehicle heat generating component in fluid communication with said coolant assembly.

10. A vehicle comprising a coolant system according to claim 1.

11. A vehicle comprising an electric vehicle thermal management system according to claim 9.

* * * * *